(12) United States Patent
Kageyama et al.

(10) Patent No.: US 8,107,165 B2
(45) Date of Patent: Jan. 31, 2012

(54) PROJECTOR SCREEN AND DISPLAY SYSTEM

(75) Inventors: Hideaki Kageyama, Shizuoka (JP); Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 72 days.

(21) Appl. No.: 12/379,701

(22) Filed: Feb. 26, 2009

(65) Prior Publication Data

US 2009/0219615 A1 Sep. 3, 2009

(30) Foreign Application Priority Data

Feb. 29, 2008 (JP) ................................. 2008-050022

(51) Int. Cl.
*G03B 21/60* (2006.01)
(52) U.S. Cl. ........................................ 359/459; 359/613
(58) Field of Classification Search .................. 359/454, 359/605, 459, 613
See application file for complete search history.

(56) References Cited

U.S. PATENT DOCUMENTS

| 7,453,637 | B2 * | 11/2008 | Taira et al. | 359/459 |
| 7,667,893 | B2 * | 2/2010 | Peterson et al. | 359/459 |
| 7,869,126 | B2 * | 1/2011 | Akiyama | 359/459 |
| 7,931,377 | B2 * | 4/2011 | Shinozaki et al. | 359/449 |
| 7,961,390 | B2 * | 6/2011 | Shiau et al. | 359/454 |
| 7,990,614 | B2 * | 8/2011 | Chou | 359/454 |

FOREIGN PATENT DOCUMENTS

| JP | 2002-023271 | 1/2002 |
| JP | 2002-234360 | 8/2002 |

* cited by examiner

*Primary Examiner* — Christopher Mahoney
(74) *Attorney, Agent, or Firm* — Edwards Wildman Palmer LLP

(57) ABSTRACT

A translucent projector screen on which light from a display unit disposed obliquely forward of the screen is projected, said projector screen integrally includes: a sheet-shaped main body; a plurality of convex lenses integrally formed on a surface of the main body; and a plurality of reflective members disposed on the main body corresponding to the convex lenses and respectively reflecting the display light emitted to the convex lenses in a specific incident angle toward the convex lenses other than the convex lenses to which the display light is emitted. The convex lenses have spherical surfaces or aspheric surfaces so that respectively collect the display light to the reflective members, and emit the display light reflected by the reflective members in a specific output angle.

10 Claims, 6 Drawing Sheets

PROJECTOR SCREEN AND DISPLAY SYSTEM

CROSS REFERENCE TO RELATED APPLICATIONS

This application is on the basis of Japanese Patent Application No. 2008-050022, the contents of which are hereby incorporated by reference.

BACKGROUND OF THE INVENTION

1. Field of the Invention

The present invention relates to a translucent projector screen on which light from a display unit disposed obliquely forward of the screen is projected, and a display system having the projector screen.

2. Description of the Related Art

Recently, a head-up display has been used in a vehicle for displaying a virtual image of data, which is not allowed to be displayed on a meter unit due to its narrow space, on a windshield so that a driver can visually recognize the virtual image superimposed on a foreground image which is seen through the windshield.

Further, because a combination meter having a plurality of display units displaying measured values of such as a vehicle speed, an engine rotation number, a fuel remaining amount, and temperature is mounted on a vehicle, it has been examined that a projection type display unit displays on a narrow space of the combination meter. Patent Document 1 discloses a display unit used in a vehicle for projecting an image. In this display unit, a first unit having a light source projects an image on a whole convex shaped screen, and a second unit having a laser displays another image superimposing on a specific position of the projected image.

Further, Patent Document 2 discloses a projector screen which prevents outside light from being mixed with light diffused by a band-shaped body. This is because when incident light is emitted from obliquely downward, the incident light is diffused by a light diffusion layer in a direction perpendicular to an emitting direction of the light, and light other than the incident light emitted in an angle different from the incident light is absorbed by a light absorption layer.

[Patent Document 1] Japanese Published Patent Application No. 2002-234360

[Patent Document 2] Japanese Published Patent Application No. 2002-23271

SUMMARY OF THE INVENTION

Objects to be Solved

However, when the screen is composed of the diffusion member, display light from a display unit is not effectively reflected to a viewer, and there is a problem that a display brightness of a screen is reduced. Further, in the screen of Patent Document 2, an incident direction of the outside light is limited. Accordingly, there is a problem that when the outside light is emitted from a direction different from the incident direction, the display brightness is reduced. For example, when the screen is used in a combination meter of a vehicle, the outside light such as sunlight enters from various angles depending on the time, thereby there is a problem that the display quality is not stabilized According to the above problems, an object of the present invention is to provide a projector screen and a display system having the projector screen with which the display brightness is prevented from being reduced even when the outside light enters from various directions.

How to Attain the Object of the Present Invention

In order to attain the object, according to the present invention, there is provided a translucent projector screen on which light from a display unit disposed obliquely forward of the screen is projected, said projector screen integrally including:
a sheet-shaped main body;
a plurality of convex lenses integrally formed on a surface of the main body; and
a plurality of reflective members disposed on the main body corresponding to the convex lenses and respectively reflecting the display light emitted to the convex lenses in a specific incident angle toward the convex lenses other than the convex lenses to which the display light is emitted,
wherein the convex lenses have spherical surfaces or aspheric surfaces which respectively collect the display light to the reflective members, and emit the display light reflected by the reflective members in a specific output angle.

According to the above, the display light from the display unit enters the convex lenses in a specific incident angle, and is collected and guided in the main body toward the reflective members. This display light is reflected toward the convex lenses other than the convex lenses to which the display light is emitted, and the light is reflected in a specific output angle by the convex lenses toward the viewer. Further, because the outside light enters the convex lenses in an angle other than the specific incident angle, the outside light is guided to the rear side of the main body and outputted outside.

Preferably, the projector screen includes a dark member disposed at a rear wall of the main body to absorb the light entering from the convex lenses and passing through the reflective members.

According to the above, the outside light entering the convex lenses is guided toward the rear side of the main body and absorbed by the dark member. Further, the dark color of the dark member can be seen by the viewer.

According to another aspect of the present invention, there is provided a display system including:
a projector screen on which light from a display unit disposed obliquely forward of the screen is projected, the projector screen including: a sheet-shaped main body; a plurality of convex lenses integrally formed on a surface of the main body; and a plurality of reflective members disposed on the main body corresponding to the convex lenses and respectively reflecting the display light emitted to the convex lenses in a specific incident angle toward the convex lenses other than the convex lenses to which the display light is emitted, wherein the convex lenses have spherical surfaces or aspheric surfaces which respectively collect the display light to the reflective members, and emit the display light reflected by the reflective members in a specific output angle, and/or further including a dark member disposed at a rear wall of the main body to absorb the light entering from the convex lenses and passing through the reflective members;
a display unit disposed obliquely forward of the projector screen and projecting light in a specific incident angle toward a plurality of convex lenses formed on a surface of the projector screen.

According to the above, the display light emitted by the display unit enters the main body of the projector screen in a specific incident angle with respect to the convex lenses of the projector screen, then, is collected by the convex lenses and is guided through the main body to the reflective members. This display light is reflected by the reflective members toward the convex lenses other than the convex lenses to which the display light is emitted, and emitted in a specific output angle via the convex lenses to the viewer. Further, because the outside light emitted into the main body of the projector screen enters the convex lenses in an angle other than the specific incident angle due to the display unit and accessories of the display unit, the outside light is guided to the rear side of the main body and outputted outside.

Preferably, the display unit projects data by scanning the display light onto the convex lenses of the projector screen.

According to the above, when the display light is scanned by the display unit onto the convex lenses of the projector screen, the display light enters each convex lens in a specific incident angle correctly. Therefore, without receiving the influence of the outside light, the display light is emitted by the convex lenses to the viewer.

Preferably, the display light composed of a laser beam is projected across the convex lenses.

According to the above, when the laser beam of the display light is projected across the convex lenses on the projector screen at the same time, averaged light from the convex lenses is outputted toward the viewer.

These and other objects, features, and advantages of the present invention will become more apparent upon reading of the following detailed description along with the accompanied drawings.

DETAILED DESCRIPTION OF THE PREFERRED EMBODIMENTS

Hereafter, an embodiment of a projector screen and a display system according to the present invention used in a combination meter for a vehicle will be explained with reference to FIGS. 1 to 7.

Figure 1:
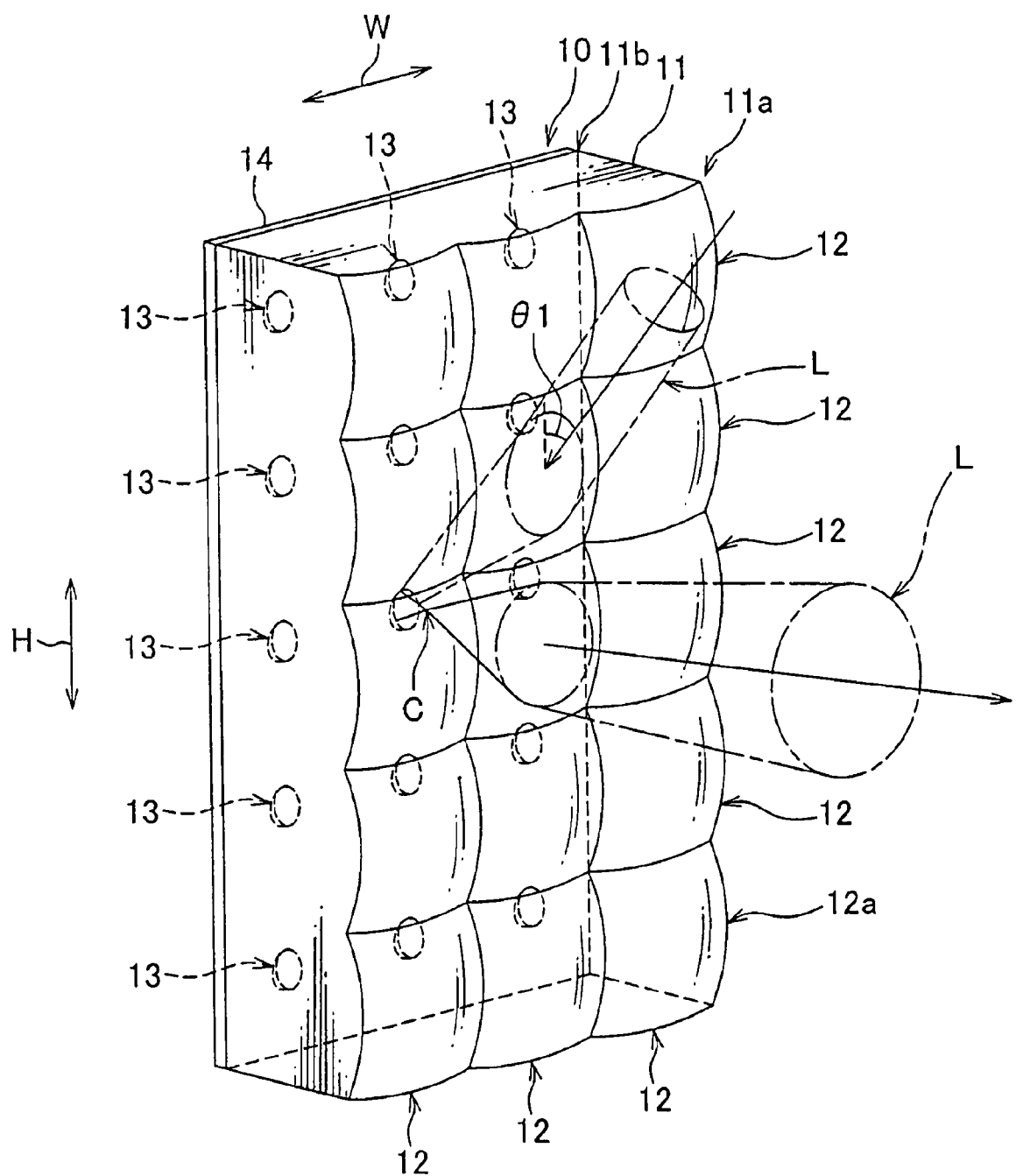
FIG. 1 is an enlarged perspective view of a projector screen according to the present invention.
Figure 2:
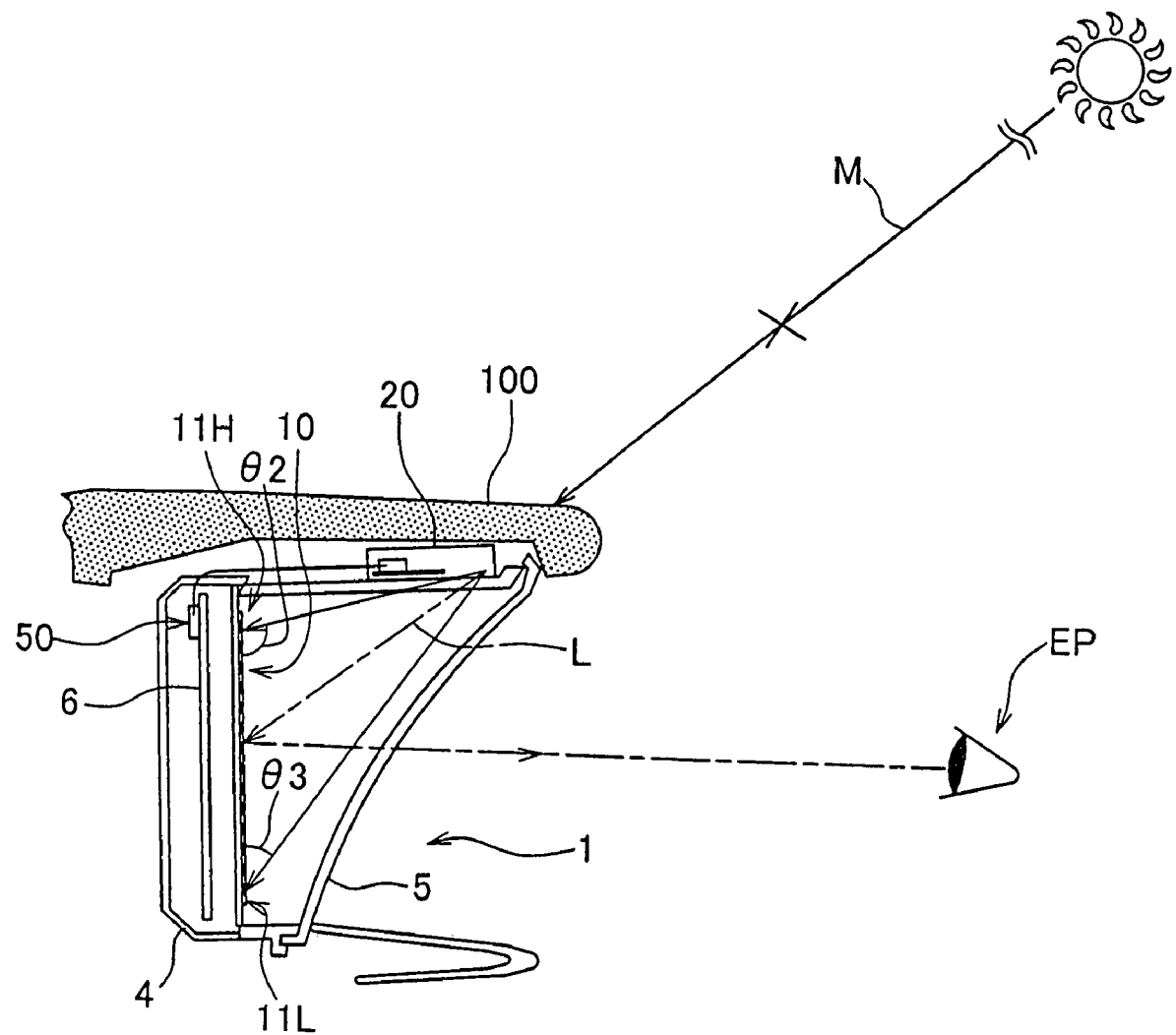
FIG. 2 is a schematic view showing a substantial structure of a display system according to the present invention.
Figure 3:
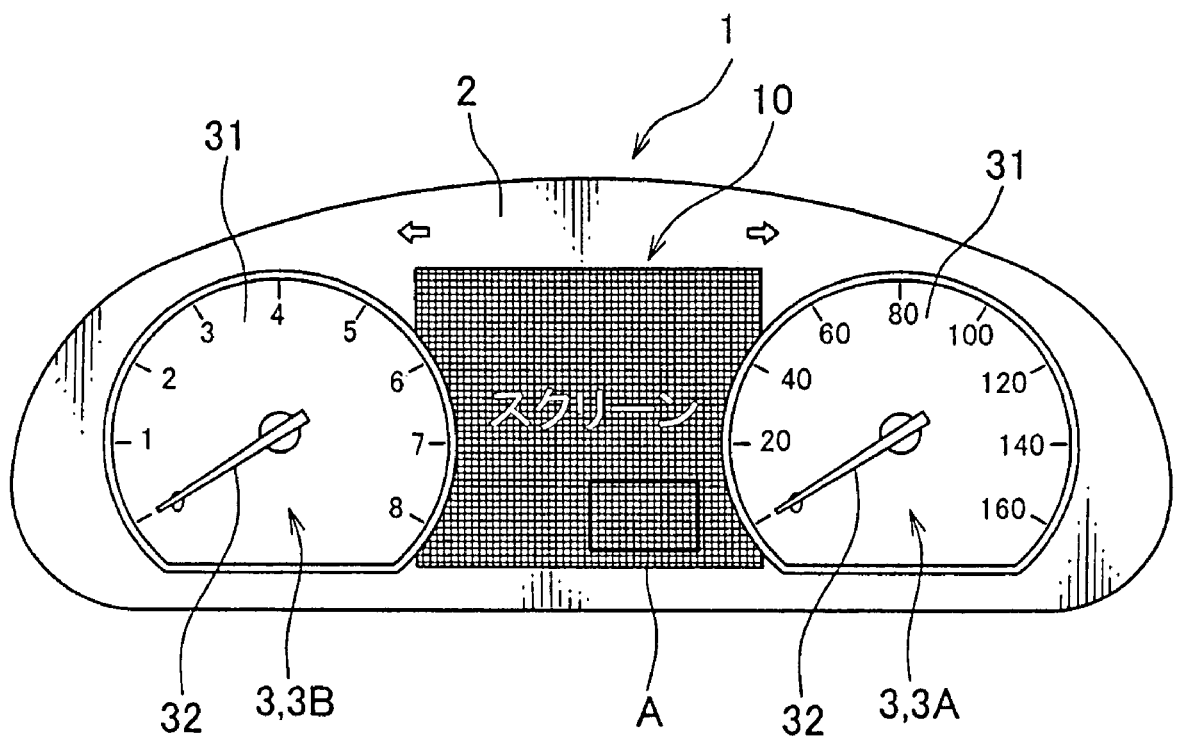
FIG. 3 is a front view showing an example of a front side of the display system shown in FIG. 2.

A projector screen 10 according to the present invention as shown in FIG. 1 is embedded in a vehicle display system 1 as shown in FIGS. 2 and 3. The vehicle display system 1 includes: a front panel 2; a plurality of meter displays 3 provided integrally with the front panel 2, and displaying a first data related to a vehicle on a front side of the front panel 2, a project screen 10 (hereafter referred to as "screen"), a display unit 20, and a controller 50. They are integrally provided in a case 4 and covered by a front glass 5. Further, the vehicle display system 1 is embedded in an instrument panel of a vehicle and is allowed to show the meter display and the like to a driver.

The front panel 2 is made of synthetic resin or the like, to which a plurality of meter displays 3 and the screen 10 are attached.

The meter displays 3 are composed of well-known speedometer 3A and a tachometer 3B. Each meter display includes: a dial plate 31 having a graduation, numbers, characters, and marks; and a pointer 32 rotatably disposed in front of the dial plate 31. A not-shown inner mechanism rotates the pointer 32 corresponding to a measured value to inform the driver about the measured value.

As shown in FIG. 2, the screen 10 is formed in a translucent sheet shape on which the display light L from the display unit 20 is projected. Incidentally, this sheet shape includes not only a thin plate but also a flat plate.

As shown in FIG. 1, the screen 10 includes: a main body 11; a plurality of convex lenses 12; a plurality of reflective members 13; and a dark color member 14.

The main body 11 is made of a translucent synthetic resin such as acrylic or polycarbonate, and formed in a sheet shape. A size of the main body 11 is determined by a size of the display area of the display unit 20, and a meter design depending on a car type.

The convex lenses are respectively projected toward an eye point of the driver, and formed integrally on a surface 11a of the main body 11. For example, as shown in FIG. 4, convex lenses are arranged in a matrix in a hundred micrometer pitch to form a lens array as an optical element. Namely, a lens array is integrally formed on the surface 11a of the main body 11.

As shown in FIG. 1, each convex lens 12 is formed in a spherical shape or an aspheric shape so that each convex lens 12 collects the parallel display light L to the reflective member 13, and emits the reflected light at the reflective member 13 in a specific angle. In detail, each convex lens only collects the incident light in a specific incident angle θ to the reflective member 13, and guides the outside light in an incident angle other than the specific incident angle θ to an outside of the reflective member 13. Further, a low reflective layer 12a is formed on a surface of each convex lens 12 by such as AR (Anti Reflection) treatment to prevent from reducing a contrast by reducing the outside light emitted from various angles to each convex lens 12.

Figure 5:
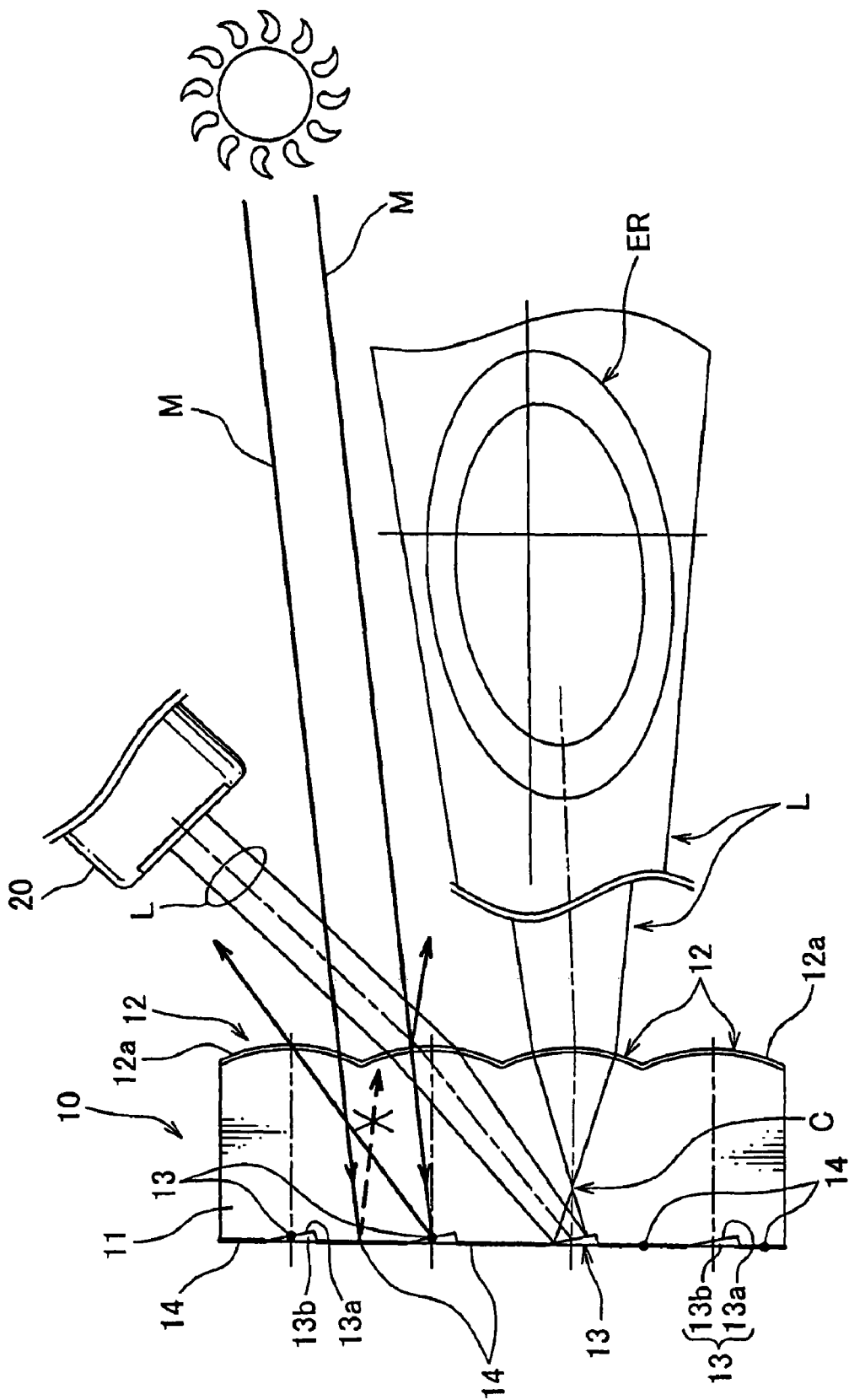
FIG. 5 is an explanatory view showing an example of operations of display light and outside light on the projector screen.

As shown in FIG. 5, each convex lens 12 is so formed to position a focus position C in a suitable position in front of the reflective member 13 in order that the display light L reflected by the reflective member 13 can be seen in an eye range ER with uniform brightness. Each convex lens 12 emits the reflected light by the reflective member 13 in a specific output angle toward the eye range ER.

Namely, by setting the position of the focus position C with respect to the reflective member 13, each convex lens can control light volume of the display light L toward the eye range ER. Incidentally, the eye range ER is a space area in which the display light can be seen even when an eye point EP is moved with respect to the vehicle display system 1.

As shown in FIG. 2, the incident angle is varied, for example, in an upper side 11H of the main body 11, the incident angle becomes θ2, and in a lower side 11L, the incident angle becomes θ3. Therefore, based on a relationship between the incident angle and the output angle, the convex lenses are formed in different optimized shapes in a vertical direction H and a horizontal direction W.

Figure 4B:
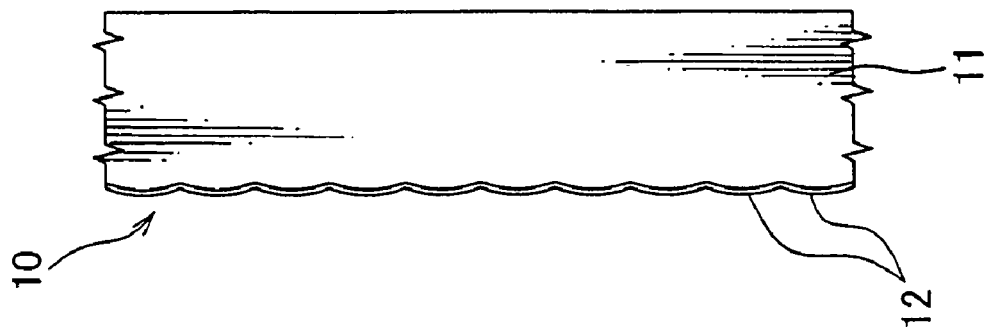
FIG. 4B is an enlarged sectional view showing the part "A" of FIG. 3.
Figure 4A:
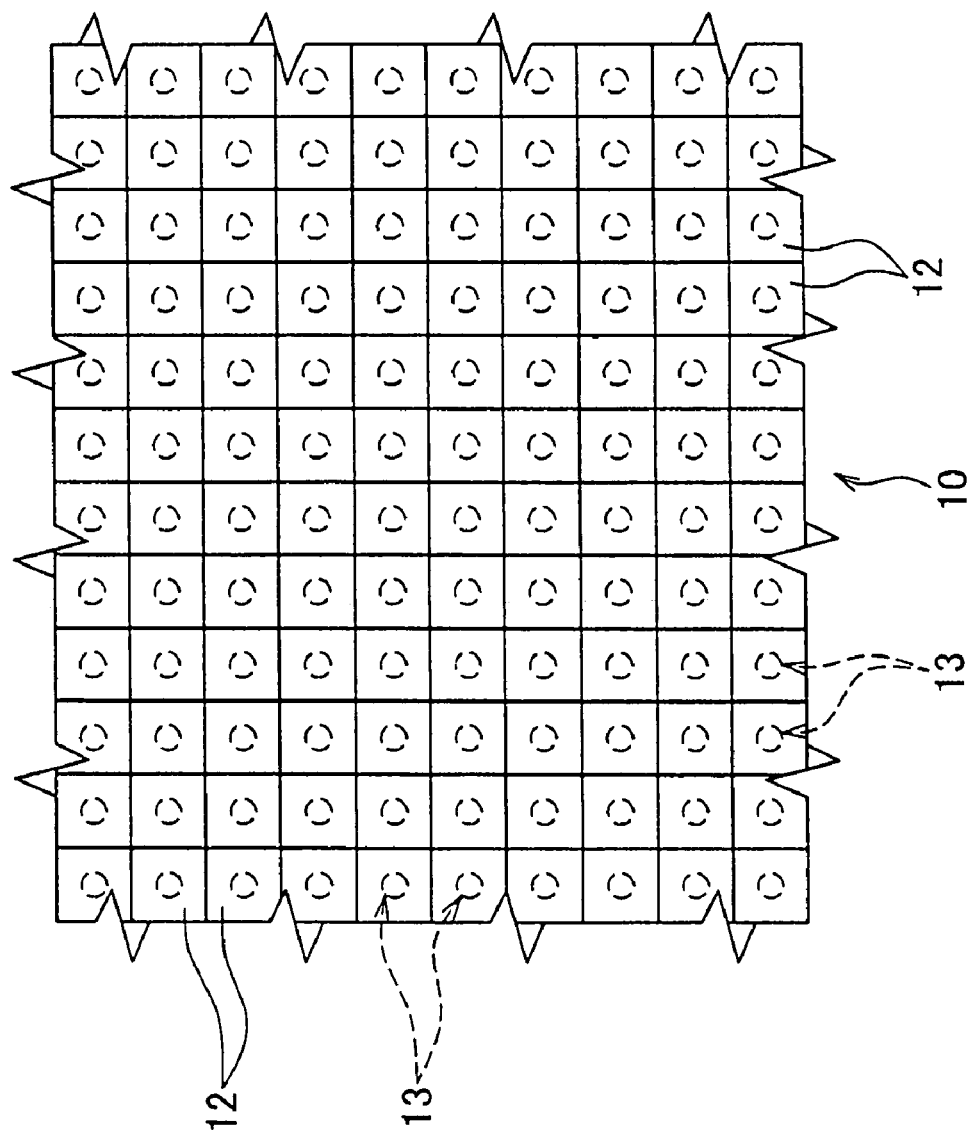
FIG. 4A is an enlarged front view showing a part "A" of FIG. 3.

As shown in FIGS. 4A, 4B, and 5, the reflective members 13 are formed on a rear side of the main body 11 corresponding to the convex lenses 12. Therefore, when the display light L is not projected on the screen 10, the reflective members are respectively shown in the convex lenses 11 when seeing from the eye point EP.

Each reflective member includes: a circular reflective surface 13a corresponding to a size of the display light L collected by each convex lens 12; and a slope 13b having an angle for reflecting the display light L toward the convex lens 12 other than the convex lens for collecting the display light L. Each reflective member 13 has an angle to reflect the outside light M toward an outside of the eye range ER.

Incidentally, because each reflective member 13 controls a reflection direction of the parallel display light L, similar to the convex lenses 12, the angles of the reflective members 13 are different from each other. Further, depending on a distance between each reflective member 13 and the corresponding convex lens 12, the position of the reflective member 13 is designed, for example, near a rear wall 11b of the main body 11 or in the middle of the main body 11. Further, when the incident angle of the display light L with respect to the convex lens 12 is large, the reflection angle of the reflective member 13 is so designed that the reflection light is emitted toward the convex lens 12 other than the convex lens adjacent to the reflective member 13. Thus, the display light is correctly emitted toward the eye range from each convex lens 12 even when the incident angle of the display light L from the display unit is large. Therefore, flexibility with respect to an installation location of the display unit is increased.

As shown in FIGS. 1 and 5, the dark color member 14 is provided at the rear wall 11b of the main body 11, and absorbs light passing through the convex lenses 12 and the reflective members 13 such as the outside light. A color of the dark color member corresponds to the design of the combination meter and is such as black, dark brown, dark gray or the like. The dark color member is formed in a film shape on the rear wall 11b of the main body 11 by painting, printing, or the like. Because the dark color member 14 partially absorbs the display light L passing through the reflective members 13, and absorbs the outside light, when the vehicle display system 1 is off and the display light is not projected, the dark color of the dark color member can be seen by the driver. A color of a typical meter used in a vehicle is black or dark. Therefore, the screen 10 can be embedded in the vehicle display system 1 without damaging the design of the vehicle display system 1.

As the display unit 20, a laser projector for scanning two-dimensionally the display light L is used. A desired display data can be displayed on the screen 10 by scanning the laser display light L on a desired area of the screen 10. For example, when a well-known ultra-slim semiconductor laser is used as the display unit 20, the controller 50 controls the brightness of the display unit 20, the power of the semiconductor laser, and the scanning of the display light L. Incidentally, as the display unit 20, various displays such as a liquid crystal display can be used.

In this embodiment, as shown in FIG. 2, the display unit 20 and an instrument panel 100 prevent the outside light M from entering the convex lenses 12 in incident angles of θ1 to θ3. Thus, the influence of the outside light M with respect to the display light L is reduced.

As shown in FIG. 2, the controller 50 is mounted on a wiring board 6 disposed at the rear side of the front panel 2. The controller 50 is composed of a microcomputer including: a central processing unit (CPU); a read only memory (ROM); and a random access memory (RAM). The CPU controls the meter display 3 and the display unit 20 according to a program stored in the ROM. The controller 50 is powered by a constant-voltage power supply connected to a vehicle battery.

The controller 50 is connected to a vehicle ignition switch via input/output circuits, and connected to various devices such as a vehicle speed sensor, a rotation sensor. The controller 50 controls the whole vehicle display system 1 including the speedometer 3A, the tachometer 3B, and the display unit 20.

Next, an example of a design method of the projector screen 10 described above will be explained with reference to FIG. 5.

Firstly, according to a size of one beam of the display light L emitted from the display unit 20, the focus point C, a size of the convex lens 12 and the like, a thickness of the screen 10 is designed. Then, under this thickness of the screen 10, a reflection angle and a reflection position of the reflective members 13 with respect to the display light L is designed. Then, according to a simulation software and an experiment, a shape and a size of each convex lens 12 optimized for all the incident angles and the output angles of the display light L are estimated, and an arrangement of the convex lenses 12 on the surface of the screen 10 is determined. In this case, depending on the size of the convex lenses 12, a gap may be provided between the adjacent convex lenses.

Next, in the vehicle display system 1 described above, an example of an operation of the screen 10 according to the present invention will be explained with reference to FIG. 5.

Under a condition that the display unit 20 does not project the display light L toward the screen 10, when the outside light M enters the main body 11 via the low reflective layers 12a of the convex lenses 12, the outside light M is guided through the main body 11 and reaches the dark color member 14 and is absorbed by the dark color member 14. Thus, a driver sees the dark colored screen 10.

Under a condition that the display unit 20 projects the display light L toward the screen 10, when the display light L enters the convex lenses 12 in specific angles θ1 to θ3, the display light L is collected toward the reflective members 13, and the reflective members 13 reflect the display light L to the convex lenses 12 adjacent to the convex lenses 12 collecting the display light L, and then the convex lenses 12 emit the display light L in a specific range toward the eye range ER. Further, the outside light M is prevented from entering the convex lenses 12 in specific angles θ1 to θ3 by the display unit 20 and the instrument panel 100, and enters the convex lenses 12 in angles other than the specific angles θ1 to θ3, thereby is guided to the rear wall 11b via the main body 11 and absorbed by the dark color member 14. Therefore, a driver can see the display light L without receiving the influence of the outside light M.

According to the projector screen 10 as above described, the display light L from the display unit 20 enters the convex lenses 12 in specific angles θ1 to θ3, and the convex lenses 12 collect the display light L toward the reflective members 13, and the reflective members 13 reflect the display light L toward the convex lenses 12 other than the convex lenses 12 collecting the display light L, and the convex lenses emit the display light L in specific output angles toward a driver. Therefore, the outside light M entering the main body 11 in angles other than the specific angles θ1 to θ3 is not reflected by the reflective members 13, and guided to the rear wall 11b, thereby the outside light L toward a driver is reduced. Accordingly, when the vehicle display system 1 is installed on a position where the outside light enters from various directions, the influence of the outside light with respect to the display light L can be reduced, and the display contrast is prevented from being reduced.

Further, because the dark color member 14 is provided on the rear wall 11b of the main body 11, the outside light M guided toward the rear wall 11b is absorbed by the dark color member 14. Therefore, the light volume of the outside light emitted from the convex lenses 12 toward a driver can be reduced. Accordingly, even when the outside light M enters the vehicle display system 1 form various directions, the influence of the outside light M with respect to the display light L is reduced, and the display contrast is prevented from being reduced. Further, because the color of the dark color member 14 can be seen by a driver, it is not necessary to use a conventional white screen, and the design flexibility is increased.

Further, because the vehicle display system 1 includes the projector screen 10 as above described, even when the outside light M enters the vehicle display system 1 from various directions, the influence of the outside light with respect to the display light L can be reduced, and the display contrast is prevented from being reduced.

Further, the display unit 20 scans the display light L toward the convex lenses 12 on the projector screen 10, and the display light L correctly enters the convex lenses 12 in specific angles θ1 to θ3. Therefore, the convex lenses 12 can emit the display light L toward a driver without receiving the influence of the outside light M, and the influence of the outside light M with respect to the display light L is further reduced.

Incidentally, in the embodiment described above, the display light L having a single laser beam is projected toward each of the convex lenses 12 on the projector screen 10. However, the present invention is not limited to this. The single beam of the display light L may be projected across a plurality of convex lenses 12.

Figure 6A:
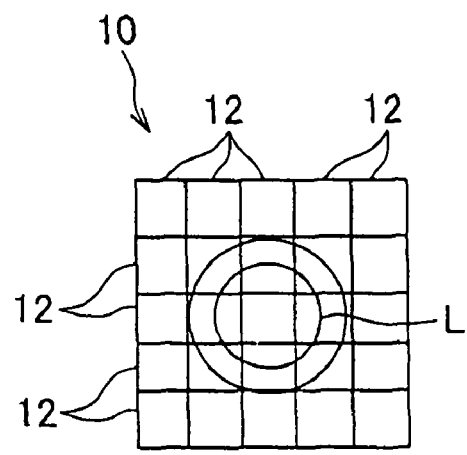
FIG. 6A is a front view for explaining an example in which one display light is projected onto nine convex lenses.
Figure 6B:
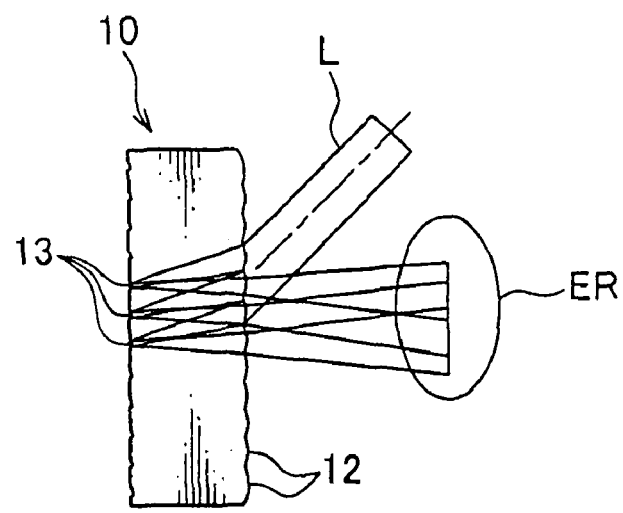
FIG. 6B is a side view for explaining the example in which one display light is projected onto nine convex lenses.
Figure 7A:
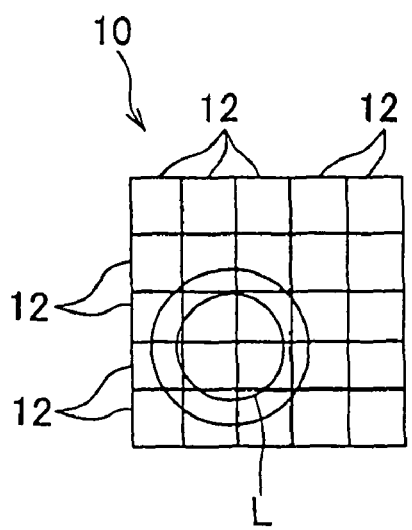
FIG. 7A is a front view for explaining an example in which one display light is projected onto twelve convex lenses.
Figure 7B:
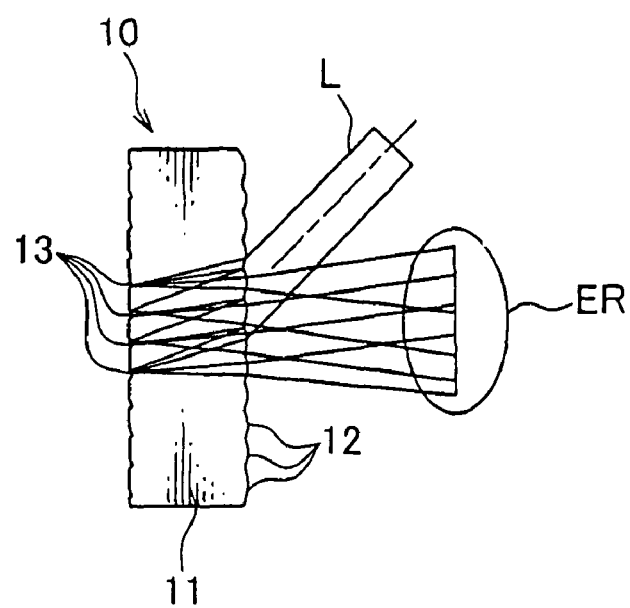
FIG. 7B is a side view for explaining the example in which one display light is projected onto twelve convex lenses.

For example, as shown in FIG. 6A, nine convex lenses 12 are assigned to a single beam of display light L. In this case, even when the display light L is a little shifted, the averaged display light L is emitted toward the eye range ER as shown in FIG. 6B. Therefore, bright spots in the whole eye range ER can be reduced. Further, as shown in FIG. 7B, twelve convex lenses 12 are assigned to the single beam of the display light L. In this case, even when the display light L is sifted in a half of the convex lens 12, the averaged display light L is emitted toward the eye range ER as shown in FIG. 7B. Therefore, the bright spots in the whole eye range ER can be reduced. Accordingly, even when the vehicle display system 1 is installed on a vibrating vehicle, the bright spot is reduced, and the display contrast is increased.

Incidentally, the projector screen 10 and the vehicle display system 1 can be used not only in a vehicle but also in a home audio system, or a conference display.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A translucent projector screen on which light from a display unit disposed obliquely forward of the screen is projected, said projector screen comprising:
   a sheet-shaped main body;
   a plurality of convex lenses integrally formed on a surface of the main body; and
   a plurality of reflective members each including a planar reflective surface and a slope having an angle, each reflective member being disposed on the main body corresponding to the convex lenses and respectively reflecting the display light emitted to the convex lenses in a specific incident angle toward the convex lenses other than the convex lenses to which the display light is emitted,
   wherein the convex lenses have spherical surfaces or aspheric surfaces which respectively collect the display light to the reflective members, and emit the display light reflected by the reflective members in a specific output angle.

2. The projector screen as claimed in claim 1, further comprising a dark member disposed at a rear wall of the main body to absorb the light entering from the convex lenses and passing through the reflective members.

3. A display system comprising:
   a projector screen as claimed in claim 2;
   a display unit disposed obliquely forward of the projector screen and projecting light in a specific incident angle toward a plurality of convex lenses formed on a surface of the projector screen.

4. The display system as claimed in claim 3, wherein the display unit projects data by scanning the display light onto the convex lenses of the projector screen.

5. The display system as claimed in claim 3, wherein the display light composed of a laser beam is projected across the convex lenses.

6. A display system comprising:
   a projector screen as claimed in claim 1;
   a display unit disposed obliquely forward of the projector screen and projecting light in a specific incident angle toward a plurality of convex lenses formed on a surface of the projector screen.

7. The display system as claimed in claim 6,
   wherein the display unit projects data by scanning the display light onto the convex lenses of the projector screen.

8. The display system as claimed in claim 6, wherein the display light composed of a laser beam is projected across the convex lenses.

9. The projector screen as claimed in claim 1, wherein the slope angle varies between the plurality of reflective members.

10. The projector screen as claim in claim 1, wherein the slope angle for certain reflective members is configured to reflect outside light toward an outside of an eye range.

* * * * *